(12) United States Patent
Gentile

(10) Patent No.: US 10,988,030 B2
(45) Date of Patent: Apr. 27, 2021

(54) ELECTRIC MOTOR, GENERATOR AND BATTERY COMBINATION

(71) Applicant: Francis Xavier Gentile, Los Angeles, CA (US)

(72) Inventor: Francis Xavier Gentile, Los Angeles, CA (US)

( * ) Notice: Subject to any disclaimer, the term of this patent is extended or adjusted under 35 U.S.C. 154(b) by 0 days.

(21) Appl. No.: 14/497,347

(22) Filed: Sep. 26, 2014

(65) Prior Publication Data
US 2016/0094055 A1 Mar. 31, 2016

(51) Int. Cl.
| | | |
|---|---|---|
| *H02J 7/00* | (2006.01) | |
| *B60L 11/18* | (2006.01) | |
| *H02J 7/14* | (2006.01) | |
| *B60L 58/10* | (2019.01) | |
| *H02K 11/30* | (2016.01) | |

(52) U.S. Cl.
CPC .......... *B60L 11/1851* (2013.01); *B60L 58/10* (2019.02); *H02J 7/0013* (2013.01); *H02J 7/0024* (2013.01); *H02J 7/14* (2013.01); *H02J 7/143* (2020.01); *H02K 11/30* (2016.01); *Y02T 10/64* (2013.01); *Y02T 10/70* (2013.01)

(58) Field of Classification Search
CPC ...... H02J 7/0013; H02J 7/0024; H02J 7/0025; H02J 7/143; B60L 58/10; B60L 58/22; B60L 53/122
See application file for complete search history.

(56) References Cited

U.S. PATENT DOCUMENTS

| | | | |
|---|---|---|---|
| 621,285 A | 5/1899 | Reed | |
| 1,971,730 A | 8/1934 | Proctor | |
| 2,239,437 A | 4/1941 | Bedford | |
| 3,241,038 A | 3/1966 | Amato | |
| 3,491,282 A | 1/1970 | Heinrich | |
| 3,555,395 A * | 1/1971 | Beery | H02J 7/34 307/29 |
| 3,628,123 A | 12/1971 | Rosa et al. | |
| 3,767,996 A | 10/1973 | Bates | |
| RE28,986 E | 9/1976 | Heinrich et al. | |
| 4,434,389 A | 2/1984 | Langley et al. | |
| 4,475,075 A * | 10/1984 | Munn | B60L 11/1809 174/DIG. 20 |
| 4,507,591 A * | 3/1985 | Kelleher | H02P 6/085 318/400.09 |
| 4,550,267 A | 10/1985 | Vaidya | |

(Continued)

FOREIGN PATENT DOCUMENTS

| | | | | |
|---|---|---|---|---|
| CN | 101752888 A * | 6/2010 | | Y02E 60/12 |
| WO | 1984003400 | 8/1984 | | |

(Continued)

*Primary Examiner* — Charlie Y Peng
(74) *Attorney, Agent, or Firm* — Fish IP Law, LLP

(57) ABSTRACT

To accomplish the invention, each individual stator pole winding has its own voltage and amperage matched battery, capacitor or storage device pack or packs and winding system controller or controllers which are signaled for operations and timing for the operation of all the similar other windings in the whole Electric Motor, Generator and battery combination without the necessity of wired interconnection of whole Electric Motor, Generator and battery combination winding electrical power in order to accomplish Electric Motor, Generator and battery combination functions.

9 Claims, 15 Drawing Sheets

(56) References Cited

U.S. PATENT DOCUMENTS

| | | | |
|---|---|---|---|
| 4,896,088 A | 1/1990 | Jahns | |
| 5,040,105 A | 8/1991 | Dhyanchand et al. | |
| 5,336,956 A | 8/1994 | Haner | |
| 6,042,349 A | 3/2000 | Ito et al. | |
| 6,049,196 A * | 4/2000 | Arai | H02K 19/26 322/29 |
| 6,124,702 A | 9/2000 | Pinkerton et al. | |
| 6,727,668 B1 | 4/2004 | Maslov | |
| 6,731,022 B2 | 5/2004 | Silverman | |
| 6,787,951 B2 | 9/2004 | Maslov et al. | |
| 6,927,524 B2 | 9/2005 | Pyntikov et al. | |
| 6,940,242 B1 | 9/2005 | Maslov et al. | |
| 6,949,908 B2 | 9/2005 | Maslov et al. | |
| 7,227,340 B2 | 6/2007 | Chen | |
| 7,416,039 B1 * | 8/2008 | Anderson | B60K 1/00 180/165 |
| 7,576,507 B2 | 8/2009 | McVickers | |
| 7,659,680 B1 | 2/2010 | McVickers | |
| 8,688,345 B2 | 4/2014 | Boughtwood | |
| 8,688,346 B2 | 4/2014 | Boughtwood | |
| 9,219,294 B2 * | 12/2015 | Albsmeier | H02J 7/007 |
| 2004/0021437 A1 | 2/2004 | Maslov et al. | |
| 2004/0145323 A1 | 7/2004 | Maslov et al. | |
| 2005/0184689 A1 | 8/2005 | Maslov et al. | |
| 2007/0062744 A1 | 3/2007 | Weidenheimer et al. | |
| 2010/0148726 A1 * | 6/2010 | Lee | H02J 7/0016 320/118 |
| 2010/0277121 A1 | 12/2010 | Hall et al. | |
| 2011/0248841 A1 * | 10/2011 | Whitlock | B60R 25/1003 340/426.1 |
| 2012/0112534 A1 | 5/2012 | Kesler et al. | |
| 2012/0161708 A1 | 6/2012 | Miura et al. | |
| 2012/0256568 A1 * | 10/2012 | Lee | B60L 15/007 318/139 |
| 2013/0024059 A1 | 1/2013 | Miller et al. | |
| 2013/0049498 A1 | 2/2013 | Boughtwood | |
| 2013/0271051 A1 * | 10/2013 | Goto | B60W 10/08 318/400.26 |
| 2014/0015488 A1 | 1/2014 | Despesse | |
| 2014/0084598 A1 * | 3/2014 | Albsmeier | H02J 7/1423 290/36 R |
| 2015/0357843 A1 * | 12/2015 | Kobayashi | H02J 7/0016 320/118 |
| 2016/0094036 A1 * | 3/2016 | Alfermann | H02J 3/38 307/44 |

FOREIGN PATENT DOCUMENTS

| | | |
|---|---|---|
| WO | WO/1984/003400 | 8/1984 |
| WO | WO/1984/003400 | 8/1985 |
| WO | WO1994014226 | 6/1994 |
| WO | WO2008007120 | 1/2008 |

* cited by examiner

Paragraph 11 of the Description: section Each individual winding may be connected to one separate controller and to only one separate chemical battery cell with no other interconnection to other systems except a detection or signaling method to determine controller operation in concert with other individual windings Prior Art
US6124702

ELECTRIC MOTOR, GENERATOR AND BATTERY COMBINATION

CROSS REFERENCE TO RELATED APPLICATIONS

This application is a continuation of PCT Ser. Nr. PCT/US14/15893 filed 11 Feb. 2014 by the present Inventor, which is incorporated by reference.

This application claims the benefit of PPA Ser. Nr 66/1763693 filed 12 Feb. 2013 by the present Inventor, which is incorporated by reference.

Disclosed as related applications and Integrated into this disclosure by specific reference to previous applications by the same inventor are: PPA Ser. Nr 66/1763693 filed 12 Feb. 2013

BRIEF DESCRIPTION OF THE SEVERAL VIEWS OF THE DRAWINGS

Drawings—Figures

As quoted from U.S. Pat. No. 6,124,702: "FIGS. 4A, 4B and 4C (collectively referred to as FIG. 4) show various alternate embodiments of a representative portion of electronics 130 of system 100 of FIGS. 1-3. The particular electronics shown in FIG. 4 includes only twelve of the thirty-six coils 126 shown in FIGS. 1-3, while providing a complete output signal for a single phase output. The twelve coils 126 shown in FIG. 4 are divided into three sets of four coils that represent three phases: A, B and C. Coils 202-208 correspond to phase A (coil 208' replaces coil 208 in FIGS. 4B and 4C, and coils 202'-206' replace coils 202-206 in FIG. 4C); coils 212-218 correspond to phase B (coil 218' replaces coil 218 in FIGS. 4B and 4C, and coils 212'-216' replace coils 212-216 in FIG. 4C); and coils 222-228 correspond to phase C (coil 228' replaces coil 228 in FIGS. 4B and 4C, and coils 202'-206' replace coils 202-206 in FIG. 4C) (all of coils 202-228 are similar to coils 126 previously described). One primary difference between FIG. 4A and FIGS. 4B and 4C is that coils 208, 218 and 228 of FIG. 4A each have one end coupled to rectifier circuitry 260, while coils 208', 218' and 228' of FIGS. 4B and 4C each have one end coupled to each other. Each configuration, as is described in more detail below, provides advantages and disadvantages when compared with the other."

"As shown in FIG. 4, each set of armature coils are connected together in series with each pair of coils having an access node therebetween. In FIGS. 4A and 4B, each access node is connected to a switch (i.e., switches 234-238, 244-248 and 254-258), as is one of the outermost coils in each set (i.e., coil 202 to switch 232, coil 212 to switch 242 and coil 222 to switch 252). In FIG. 4A, the other outermost coil is connected directly to the output circuitry as is described below, while in FIG. 4B, the other outermost coils are coupled together. For example, coils 202-208 are connected to switches 232-238; coils 212-218 are connected to switches 242-248; and coils 222-228 are connected to switches 252-258." "Switches 232-258, which preferably are back-to-back SCRs, are connected to rectifier circuitry 260 that may include any known circuitry capable of combining and rectifying the three phase input signals received from the three sets of armature coils 202-228." "As shown in FIG. 4, rectifier circuitry 260 includes several diodes 262 formed into an array (FIG. 4A shows twelve diodes, FIG. 4B includes only six, and FIG. 4C includes twenty-four unidirectional thyristors 262' (SCRs) instead of diodes 262 and switches 232-258). The rectified output is provided to inverter circuitry 270 that also may include any known circuitry capable of inverting the rectified signal to provide a single phase AC output signal. As shown, inverter circuitry 270 includes four switches 272 that are connected together and sequenced to provide the single phase AC output to load R.sub.L. Switches 272 preferably are unidirectional SCRs (or thyristors)."

Figure 1:
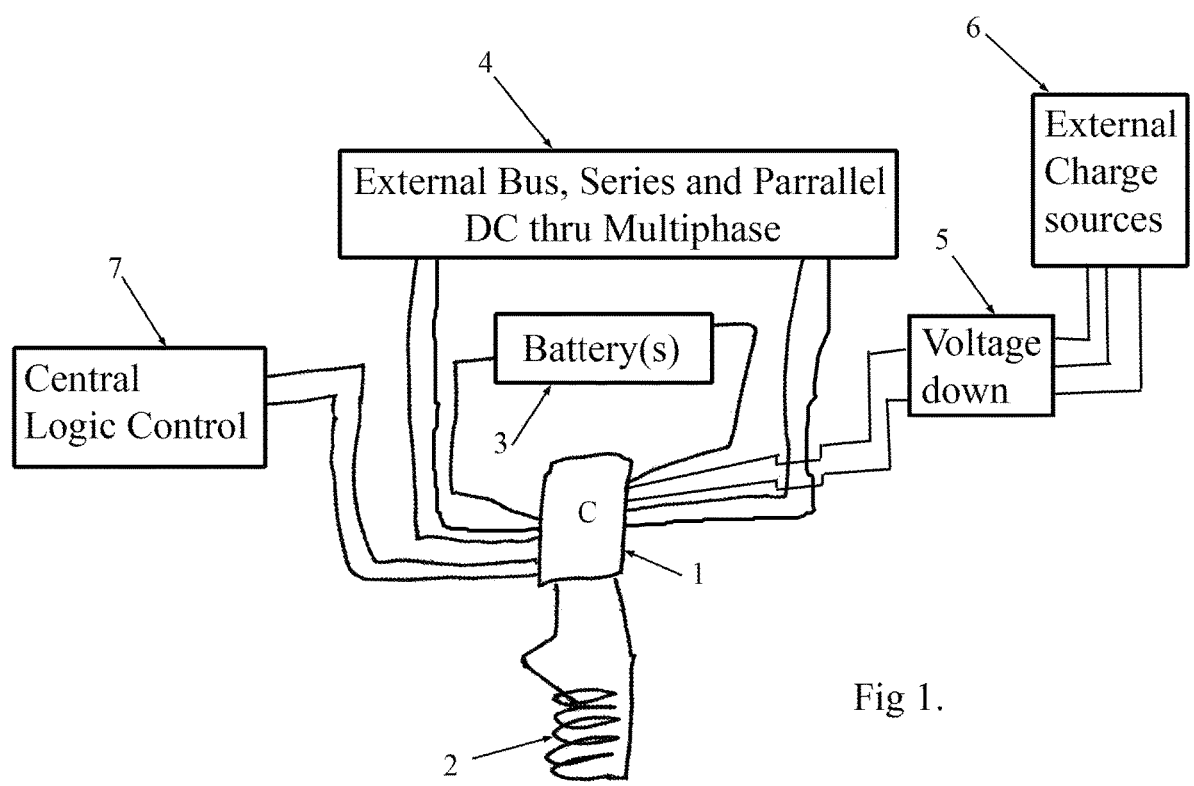
FIG. 1 A block diagram wherein the individual pole and coil is connected to the individual pole control which is connected to the battery to provide charging and discharging control and limiting as signaled by a central logical control signal connection by wire or radio or light waves or other means.

"System 100 is operated by having prime mover 114 rotate rotor 104 (including permanent magnets 120) at constant or variable speed. The rotation, combined with the permanent magnetic field, induces a voltage in coils 202-228. During the zero voltage crossing of the desired sinusoidal output half-wave, or if no power is to be applied to the electrical load, all of switches 232-258 remain OPEN. During the low voltage portion of the desired sinusoidal output half-wave, any of switches 238, 248 or 258 may be closed at an appropriate time to apply timed pulses to the electrical load thereby constructing the appropriate low voltage portion of the desired sinusoidal output half-wave. As the voltage of the desired output half-wave increases, any of switches 236, 246 or 256 may be closed at the appropriate time to construct a higher voltage portion of the half-wave. Still higher voltage portions of the output half-wave are constructed by appropriately closing any of switches 234, 244 or 254. At the peak voltage portion of the desired sinusoidal output half-wave, any of switches 232, 242 or 252 may be appropriately closed."

Figure 4:
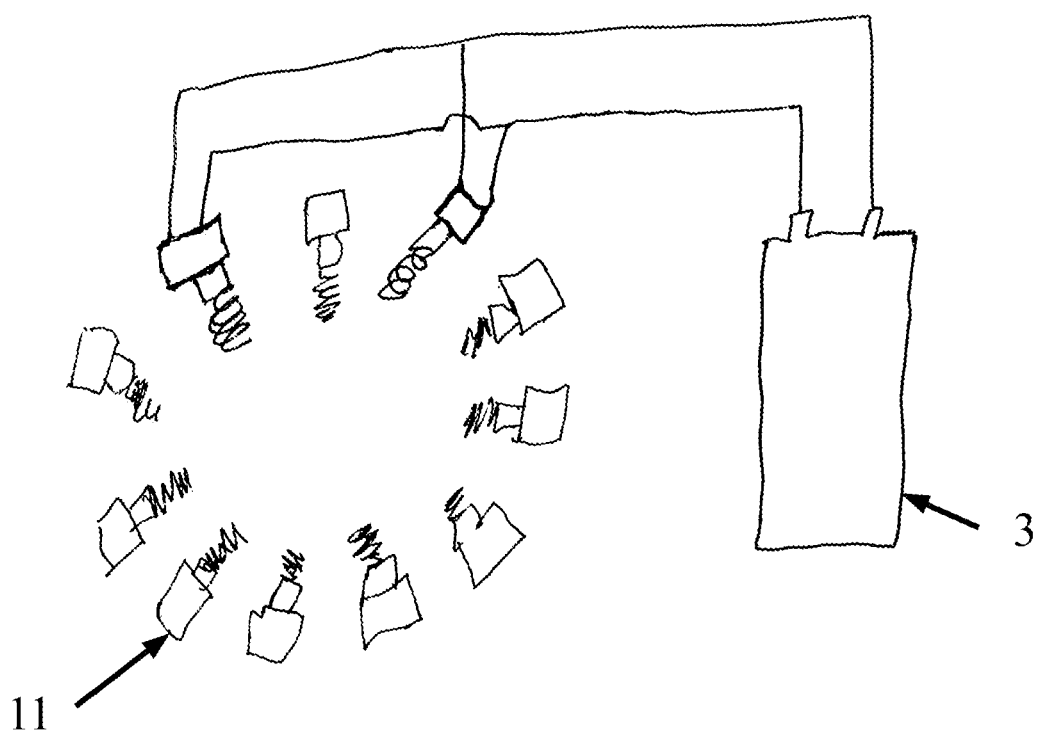
FIG. 4 A block diagram wherein more than one individual pole windings and controllers that are a subset of the total windings in the motor generator are attached in parallel to a single individual chemical cell (B).

"One advantage of the configuration shown in FIG. 4C is that it does not require any passive diodes (i.e., diodes 262), while using the same number of active switches as the circuitry of FIG. 4B to achieve the same switching resolution. The elimination of diodes 262 results in a reduction of the number of semiconductor conduction losses, as well as a reduction in the cost of the electronics. It should be noted that each of switches 232 through 238, 242 through 248 and 252 through 258, shown in FIGS. 4A and 4B are each comprised of two semiconductor devices oriented for conduction of current in opposite directions. The voltage step resolution obtained in FIG. 4C is the same as that obtained in FIG. 4B—7 steps per phase—as opposed to that of FIG. 4A—only 4 steps per phase."

"It also should be noted that the circuit of FIG. 4C also is preferred for motoring, in which case inverter switches 272 may be used for modulation of the input power source, which can be a DC power supply or a source of either high or low frequency AC. For some input waveforms, the four inverter switches 272 must be transistors or other devices capable of being turned OFF while conducting current. These devices can include, for example, thyristors if a means of forced commutation is provided."

Figure 2:
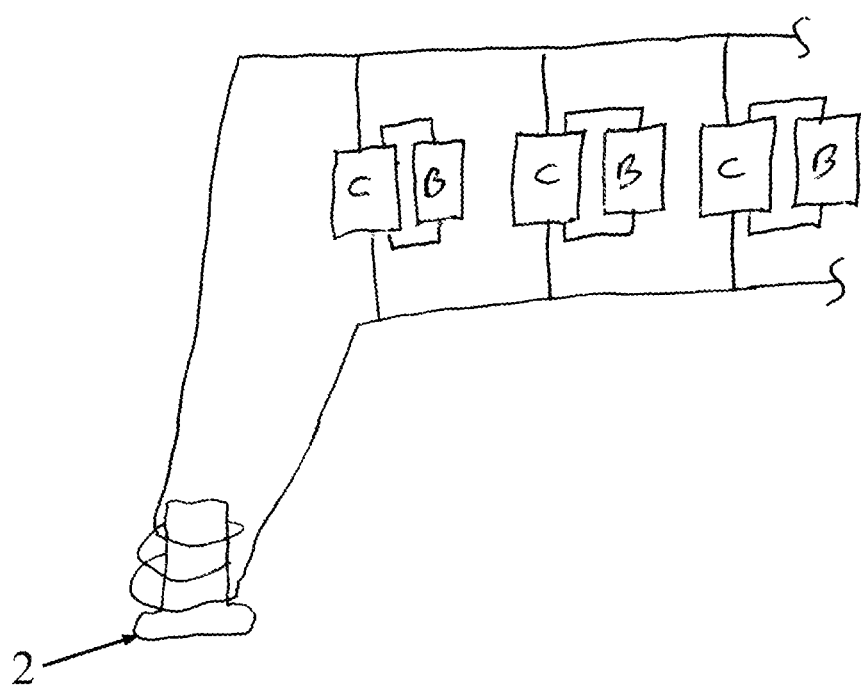
FIG. 2 A block diagram wherein the individual windings chemical cells (B) in parallel with each chemical cell having its own separate controller (C).
Figure 3:
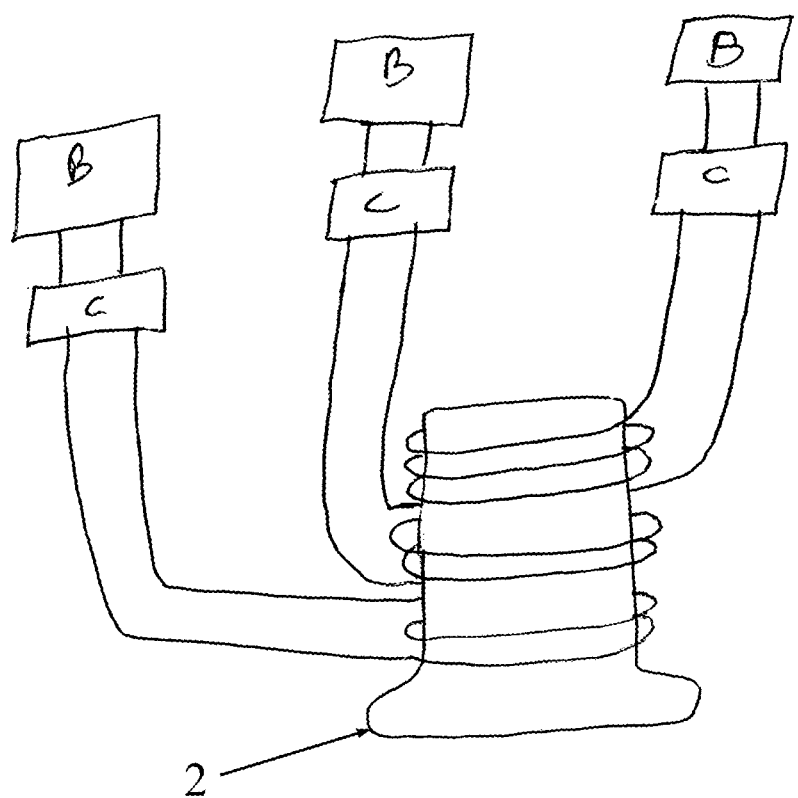
FIG. 3 A Block diagram wherein on a single pole location are coiled separate individual pole windings which are each attached to individual chemical cells (B) in parallel with each chemical cell having its own separate controller (C).
Figure 13:
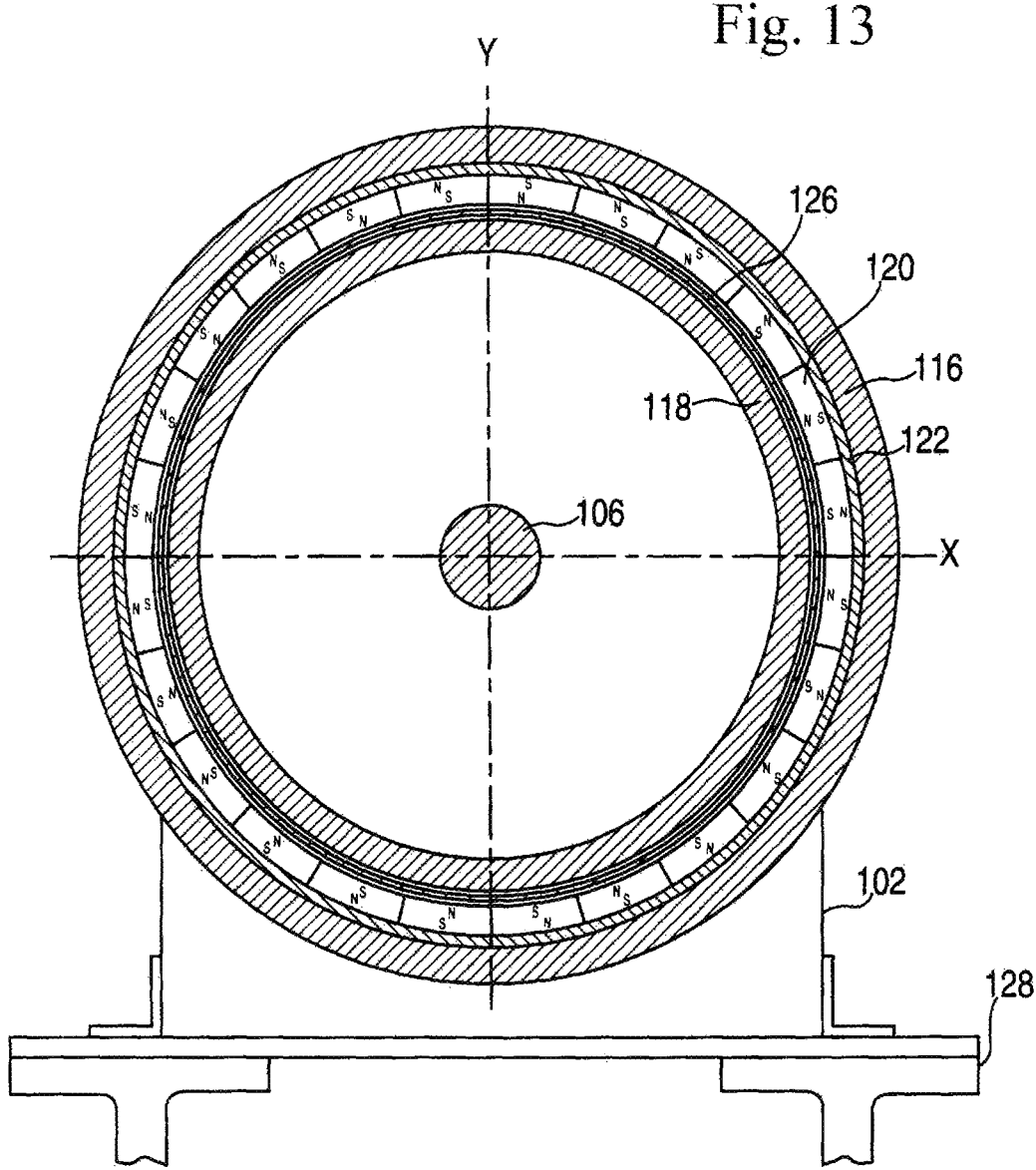
Figure 14:
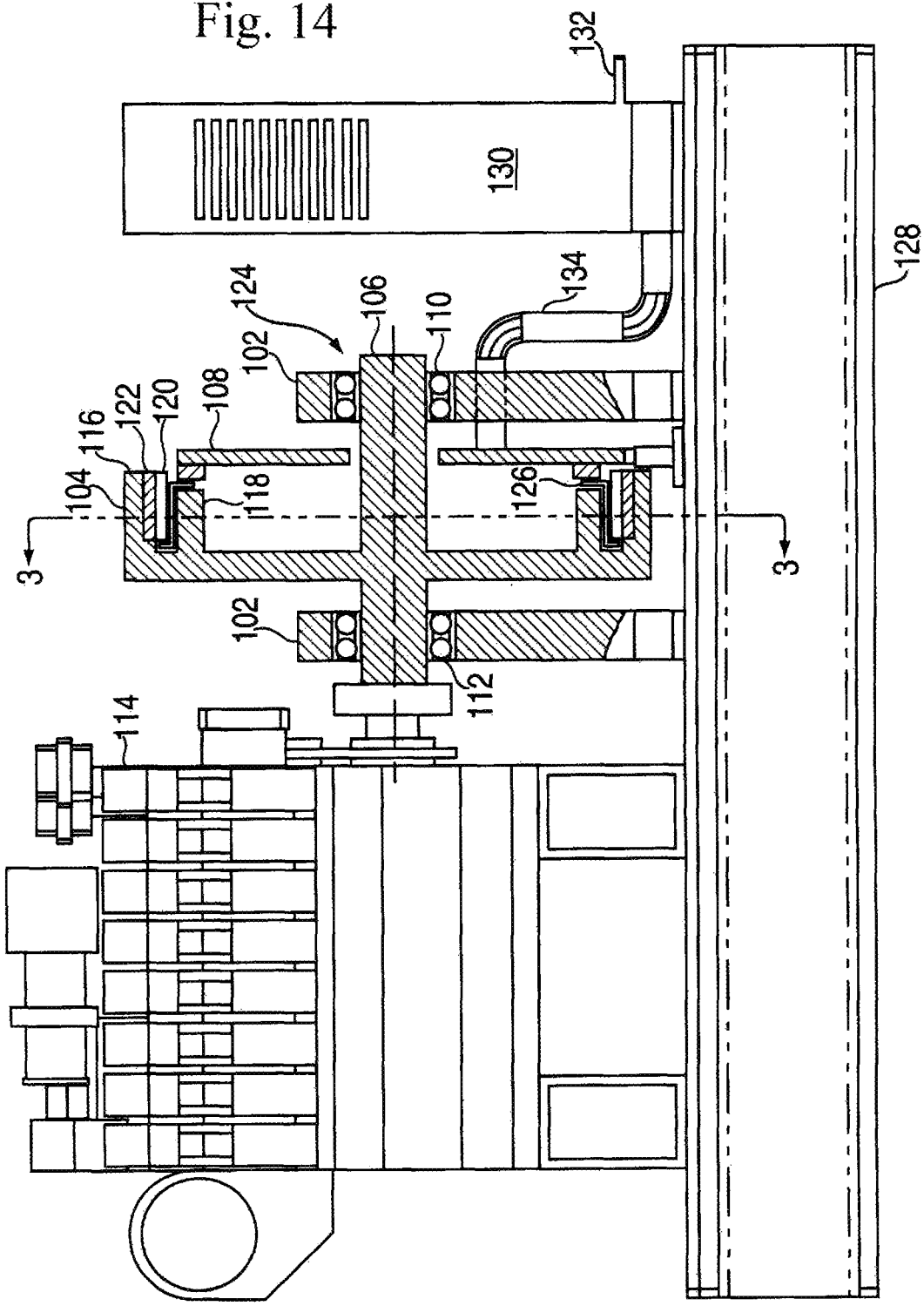
Figure 15:
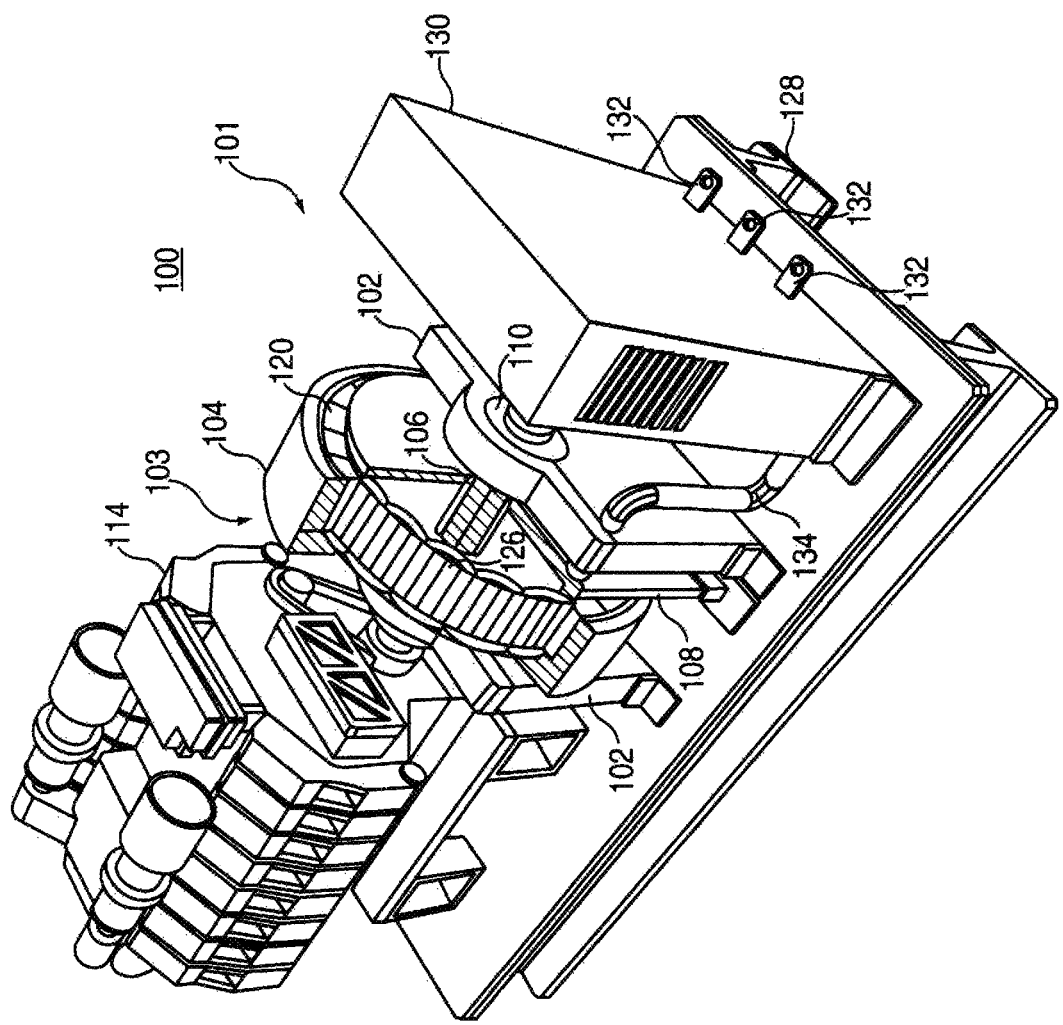

FIG. 13 is a prior art methods described as "cyclo converting" in U.S. Pat. No. 6,124,702 drawing FIG. 3 showing a sectional view of a motor generator.

cross-sectional view of the electrical machine cycloconverter of FIGS. 14 and 15 taken along line 3-3;

FIG. 14 is a prior art methods described as "cyclo converting" in U.S. Pat. No. 6,124,702 drawing FIG. 2 showing a sectional view of a motor generator.

As quoted from U.S. Pat. No. 6,124,702: "assembly 108 includes a total of thirty-six armature coils 126."

"also includes a frame 128 that electrical machine 103, mounts 102, engine 114 and electronics 130 are mounted to. Electronics 130 includes the switches that are connected to armature coils 126, and rectifier, inverter and control circuitry that are shown in FIG. 4 and described in more detail below. Electrical machine 103 optionally may provide any number of phases of output power. As shown in FIG. 1, electrical machine 103 provides three phase output power via terminals 132 connected to electronics 130. Moreover, electronics 130 is connected to armature coils 126 via, for example, cable 134"

FIG. 15 is a prior art methods described as "cyclo converting" in U.S. Pat. No. 6,124,702 drawing FIG. 1 showing ¾ view and cutaway of a motor generator.

As quoted from U.S. Pat. No. 6,124,702: "assembly 108 includes a total of thirty-six armature coils 126."

"also includes a frame 128 that electrical machine 103, mounts 102, engine 114 and electronics 130 are mounted to. Electronics 130 includes the switches that are connected to armature coils 126, and rectifier, inverter and control circuitry that are shown in FIG. 4 and described in more detail below. Electrical machine 103 optionally may provide any number of phases of output power. As shown in FIG. 1, electrical machine 103 provides three phase output power via terminals 132 connected to electronics 130. Moreover, electronics 130 is connected to armature coils 126 via, for example, cable 134."

DRAWINGS—ELEMENTS LETTERS

Individual Chemical Cell or capacitor discharge and charge control (C)
Individual Chemical Cell or capacitor (B)

DRAWINGS—REFERENCE NUMERALS

1 Individual Pole Control
2 Individual Pole and Coil of a more than one in a single or multiphase motor-generator with or without a magnetically conductive core materiel
3 Individual Chemical Cell, Battery or Batteries or Capacitors
4 External Bus, Series and Parallel, DC thru Multiphase
5 Voltage Step Down
6 External Charge Sources
7 Central Logic Control
8 Large in proportion single Chemical Cell or Capacitor
9 Partial View of Motor Generator Stator
10 Partial View of Motor Generator Rotor
11 Stator, Coils, Electronics and Batteries around Periphery

DESCRIPTION

An individual self contained chemical reaction or properties of voltage cell of a chemical battery or an individual capacitor construction is defined here as an individual chemical cell. References to a coil or pole are defined here as being part of a the stator of a rotating electromagnetic motor or generator. Descriptions, drawings and other references to single pole motor-generator configurations are also the description of distributed and overlapped windings, also described as lapped phase, lap wound stators, staggered coils group and windings controlled in known methods such as rotating field applications for example 3 phase induction type configurations where groups=poles×phases, pole pitch=circumference of stator/poles.

The invention is a motor generator battery architecture for maximizing charging and discharging utilization of the batteries in a battery motor generator combination and thereby reduce the time required to charge batteries.

Each individual chemical cell has a limit to the amount of amperage of recharging. When the chemical cells are placed in series, the maximum amperage stays the same, it does not increase, the watts do increase and the charge time increases therefore it takes longer access the full potential of a high voltage battery pack made up of many chemical cells in series. The invention accesses the individual charging maximum potential of each individual cell.

The invention can produce and absorb the low voltage and high amperage of individual chemical cells for propulsion and generation utility which unexpectedly contradicts an industry wide philosophy of higher voltage battery packs to access short term recharging battery capacity spread across many batteries, with the disadvantage that the existing design battery packs usually are not deeply discharged, and are often unable to accept regenerative braking energy recovery because the battery packs are fully charged. This invention's ability to deeply discharge and then accept large amounts of regenerative braking energy recovery, results in more efficient use of the batteries carried. Therefore with this invention the amount and weight of batteries carried can be reduced for the same performance. For example the invention's advantages can be used in electric vehicles, or electric vehicles that can be towed by other vehicles or backwards driven by other rotating machines or within self contained vehicles containing an internal combustion engine commonly known as a hybrid.

Battery chemical cell voltages may be as low as 1 to 3 volts with a group of batteries interaction with the motor adding up to hundreds of amperes, it is unexpected and unperceived to operate at such low voltage and high amperage.

Other prior art methods such as "cyclo converting" in U.S. Pat. No. 6,124,702 require switching of the coils between series and parallel to make changes, this invention is completely independent of grouping coils and batteries by switching. The 2 or many more individual coil and battery combinations are only interconnected by logical command not directly connected to the operating voltages of the coil and battery combinations.

The motor generator battery architecture and type and methods of electrical control can be synthesized by logical commands of individually independently enabled pole, controller and battery configurations. Therefore the motor generator battery architecture can adapt to a variety of external electrical inputs and outputs.

While the motor-generator is still in operation, individual cells can be removed from discharge so as to be protected from over discharge cell reversal damage. Individual cells can be charged while other cells are being discharged all while the vehicle is still in operation. An individual cell can be protected from overcharge while other cells are being charged. The motor-generator battery can continue to function usefully with failed or inoperative poles. Single failed pole batteries or controllers can be individually replaced, avoiding motor replacement costs and delays and shipping. In some designs 'stator' pole coil(s) could be changed without rewinding an entire machine stator, as the pole windings are not interconnected inside the motor-generator. In existing designs a single chemical cell failure or controller failure can disable the vehicle and require replacement of entire battery packs, controllers or motor-generators.

The invention reduces the distance of connecting wire and therefore reduces collapsing field controller switching flyback inductance between battery, controller and coil. Long conductors may induce currents upon field collapse, which may destroy switching components and force the use of protection capacitors to absorb the collapsing field energy. Voltage may drop on the rise of current and rise on the drop of current due the inductance of the conductors. Long cables are heavy and may consume precious or semiprecious metals. Long cables get hot, waste energy and melt. In the invention the high current goes over a short path, and many paths distributed for cooling with large surface area to watts conducted as compared to few large cables. The short distances reduce wire heating losses from ordinary conductor resistance and save vehicle weight.

The inventions allows distribution of controller and batteries around the motor generator frame therefore allowing the use of a single cooling system that may be powered by a shaft driven fan for direct air cooling flowing over each individual component and chemical cell or its cooling interface.

To accomplish the invention, each individual stator pole winding has its own voltage and amperage matched battery, capacitor or storage device pack or packs and winding system controller or controllers which are signaled for operations and timing for the operation of all the similar other windings in the the whole Electric Motor, Generator and battery combination without the necessity of wired interconnection of whole Electric Motor, Generator and battery combination winding electrical power in order to accomplish Electric Motor, Generator and battery combination functions. Each individual winding may be connected to one separate controller, and to only one separate chemical battery cell with no other interconnection to other systems except a detection or signaling method to determine controller operation in concert with other individual windings.

A configuration is illustrated in FIG. 1. block diagram where the individual pole and coil 2 is connected to the individual pole control 1 which is connected to the battery 3 to provide charging and discharging control and limiting as signaled by a central logical control 7 signal connection by wire or radio or light waves or other means.

In FIG. 1. block diagram an external charging source 6 of single, double or three phase or DC can be stepped down and converted to the ultimately low DC voltage that the controller can use to charge a single chemical cell 3 at the cell's maximum ampere capacity and speed using all the existing means of sensing battery condition.

Also shown FIG. 1. block diagram in a generator mode the individual pole control 1 is able to synthesize electrical output to one or more external buss connections 4 including series and parallel connections to other individual pole external buss controls in a variety of external output styles commanded by the central logic control 7 including but not limited to a simultaneous variety of DC single phase, double phase and 3 phase.

FIG. 2. block diagram illustrates individual windings chemical cells (B) in parallel with each chemical cell having its own separate controller (C) which would allow the advantages of chemical cell voltage operation where combinations of motor generator shaft speed and diameter and power would best be applied to more wattage and amperage than an single individual cell could accommodate.

FIG. 3. block diagram shows a single pole location 2, where there are more than one coiled separated individual pole windings which are attached to individual chemical cells with each chemical cell having its own separate controller (C). This configuration allows synthesis or inverting of of DC into AC by the overlapping of square waves magnetically summing into a ziggurat pyramid shaped imitation of a smooth sine wave at a controller frequency as low as the square wave generated itself. In contrast many other controllers and invertors switch at radio frequency high pulse speeds to create a sine wave which has switching and magnetic heating losses and interference with nearby electronics. However the overlapping square wave method has differences in on off timing that causes one coil in the multi coil pole to induce voltage in the other dormant coils which accidentally act as transformers sending power back towards the other coils controllers and counter productive magnetic fields at inappropriate times. Trapezoidal or other wave shape with simultaneous synchronized control could be avoid these problems of a shared pole winding.

FIG. 4. block diagram shows where combinations of motor generator shaft speed and diameter and power could be best be applied to wattage and amperage of a large single individual cell such as a large lead acid boat battery by having more than one individual pole windings 2 and controllers 1 that are a subset of the total windings around a motor-generator stator attached in parallel to a single individual chemical cell (B).

Figure 5:
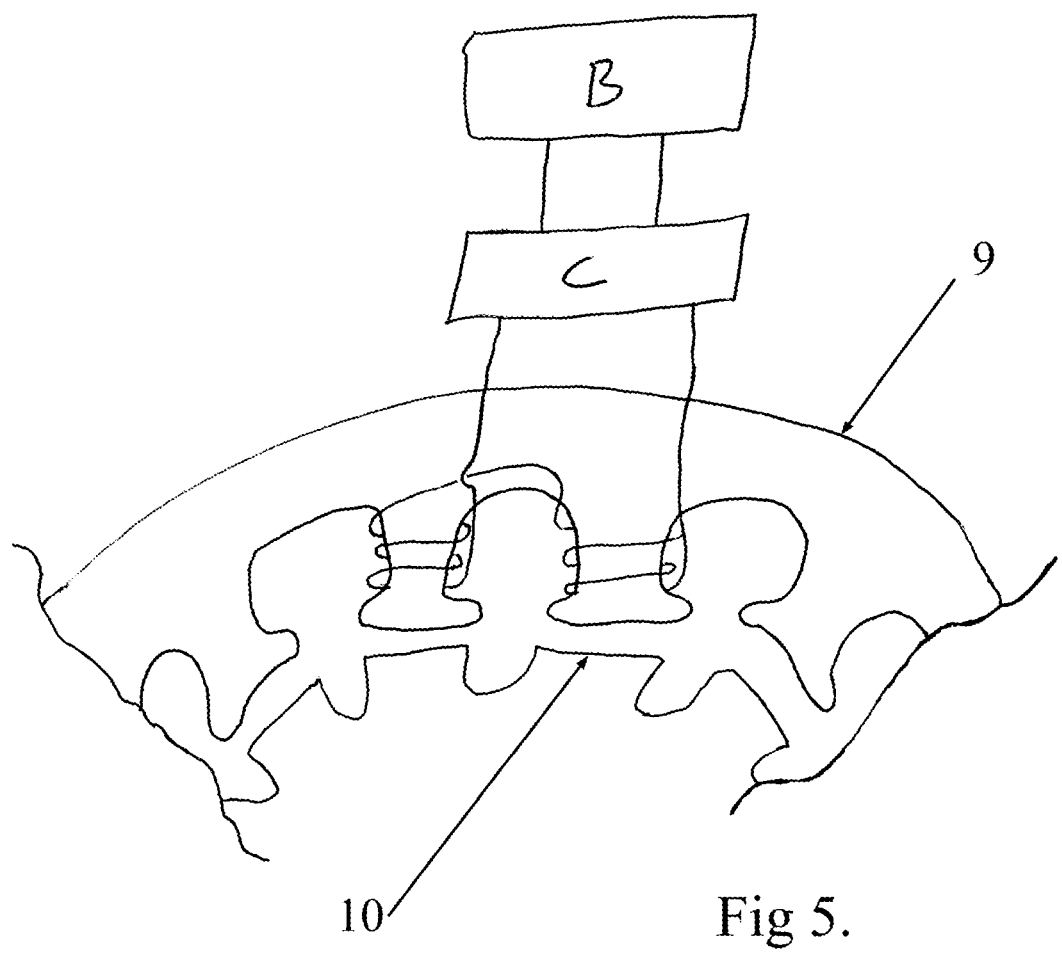
FIG. 5 A block diagram wherein more than one individual pole windings that are a subset of the total motor generator windings are connected in parallel and wound for in the same electric polarity are connected to a controller (C) which is connected to a single large individual chemical cell (B).
Figure 6:
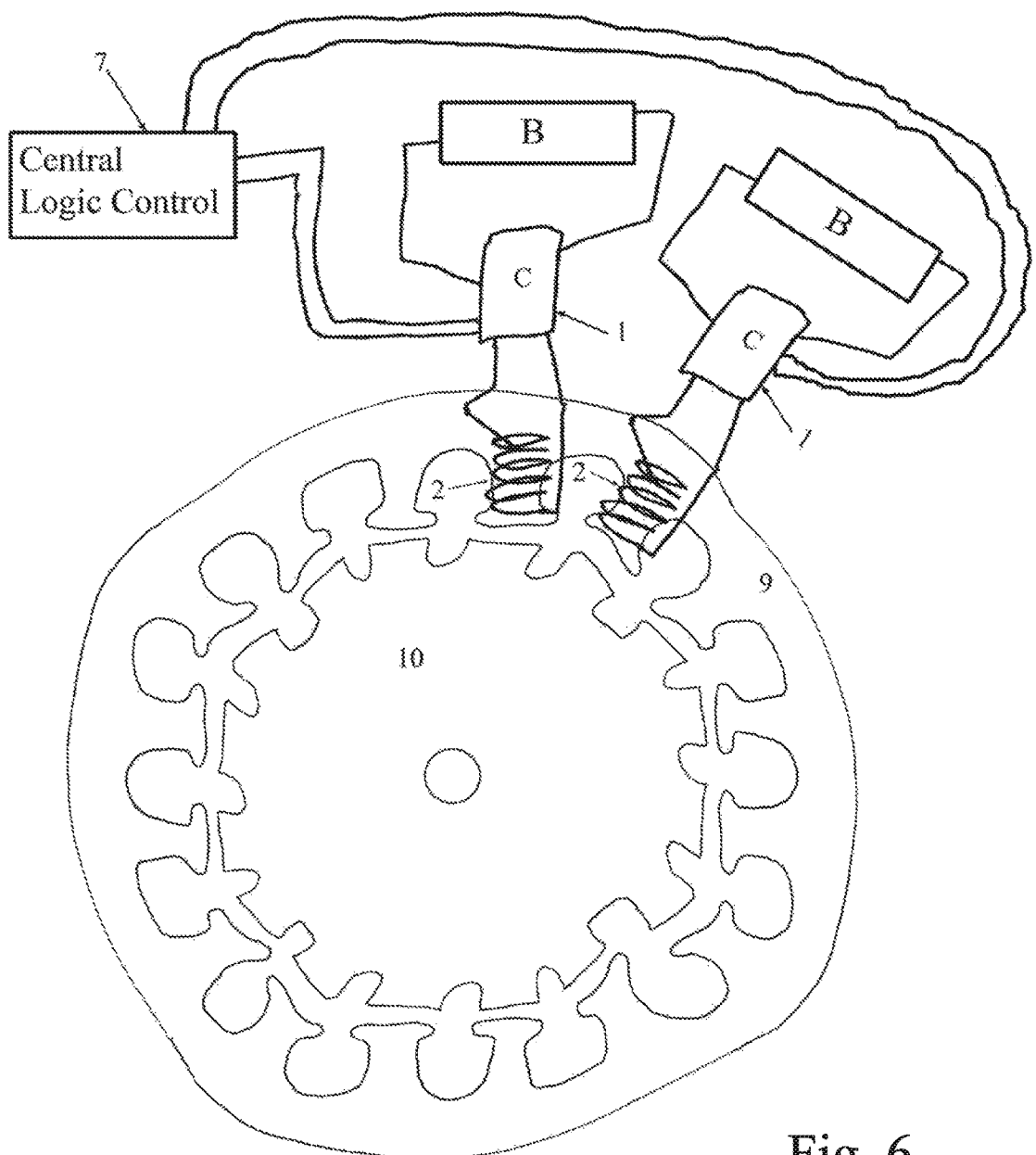
FIG. 6 is a subset of FIG. 1 where an air pole or schematic pole is re-represented with a stator and rotor schematically represented as in FIG. 5 as assumed in FIG. 1 based on the title, disclosure and references. It is also as subset of FIG. 1 as the quantity of possible energy storage devices is reduced to the minimum individual chemical cell (B) and external optional outputs and inputs of power are not shown. This figure continues to show that controllers are connected to a central control.
Figure 7:
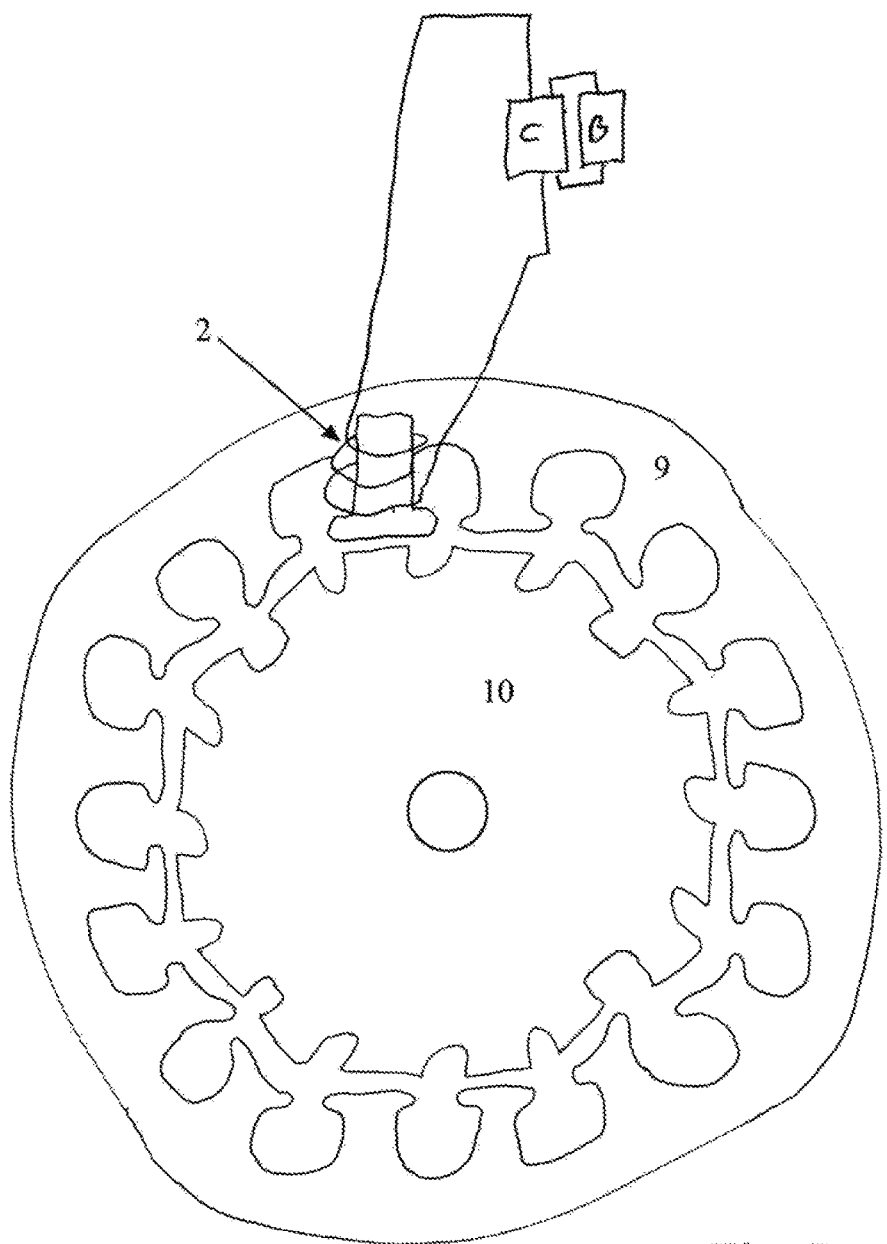
FIG. 7 is a subset of FIG. 2 with a stator and rotor schematically represented as in FIG. 5 as assumed in FIG. 2 based on the title, disclosure and references. Where one winding is reduced to one individual cell (C) and it's individual controller (B) by removing the drawing of the option of additional to infinity repetitions in electrical parallel of the same. That controllers are connected to a central control has been established in FIG. 1 which gives detail of possible controller connections.
Figure 8:
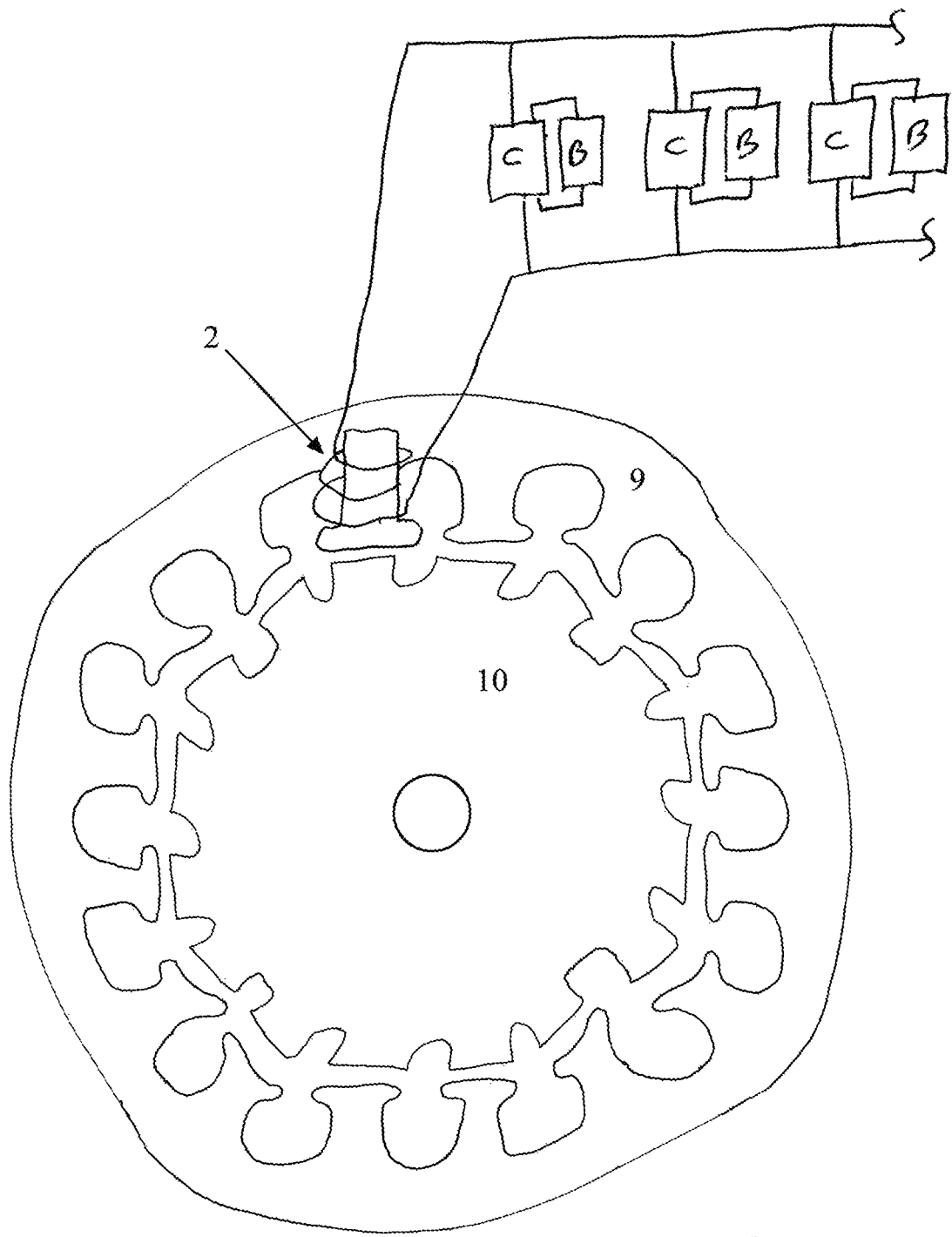
FIG. 8 is the same as FIG. 2 with a stator and rotor schematically represented as in FIG. 5 as assumed in FIG. 2 based on the title, disclosure and references.
Figure 9:
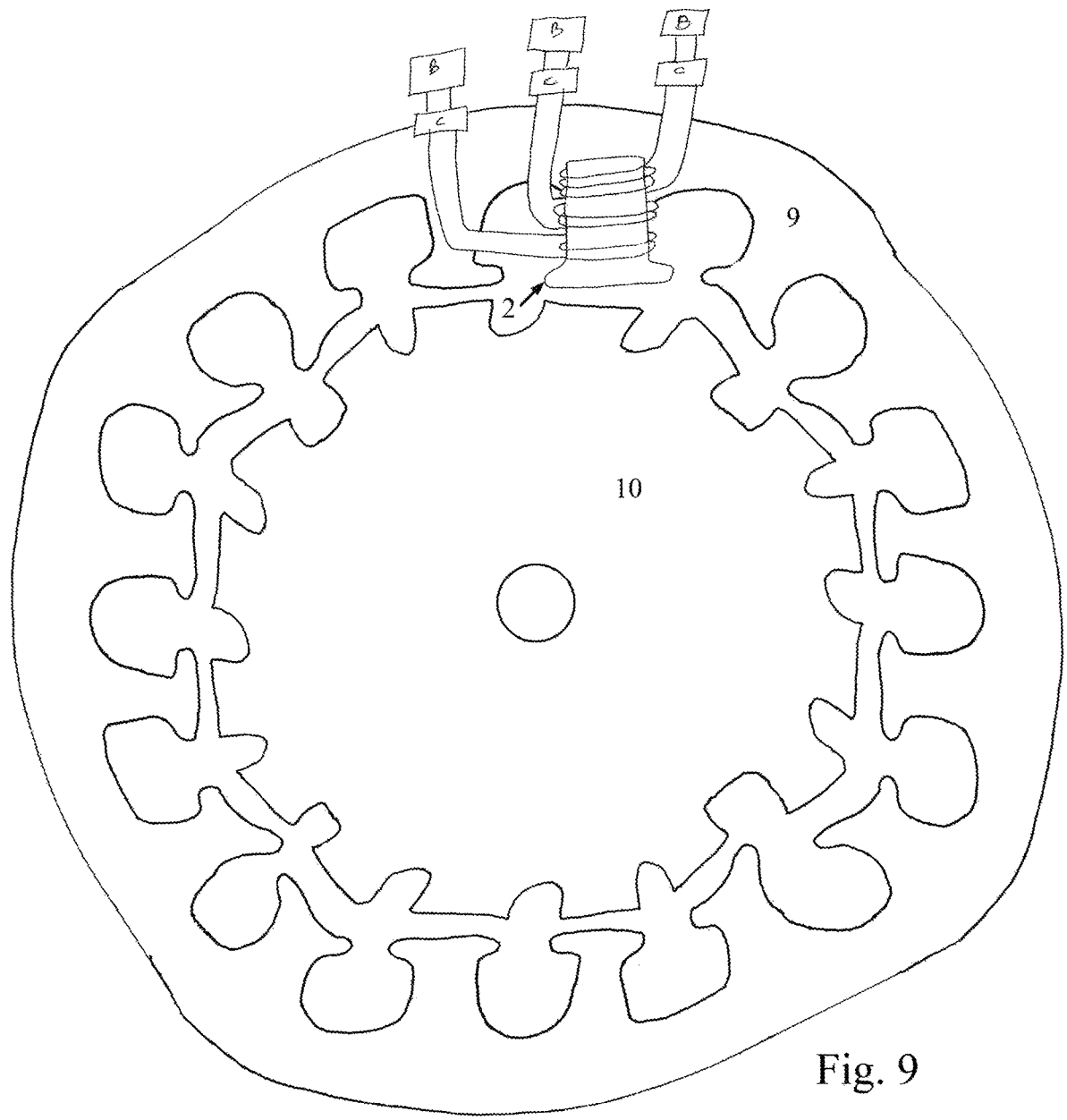
FIG. 9 is the same as FIG. 3 with a stator and rotor schematically represented as in FIG. 5 as assumed in FIG. 3 based on the title, disclosure and references.
Figure 10:
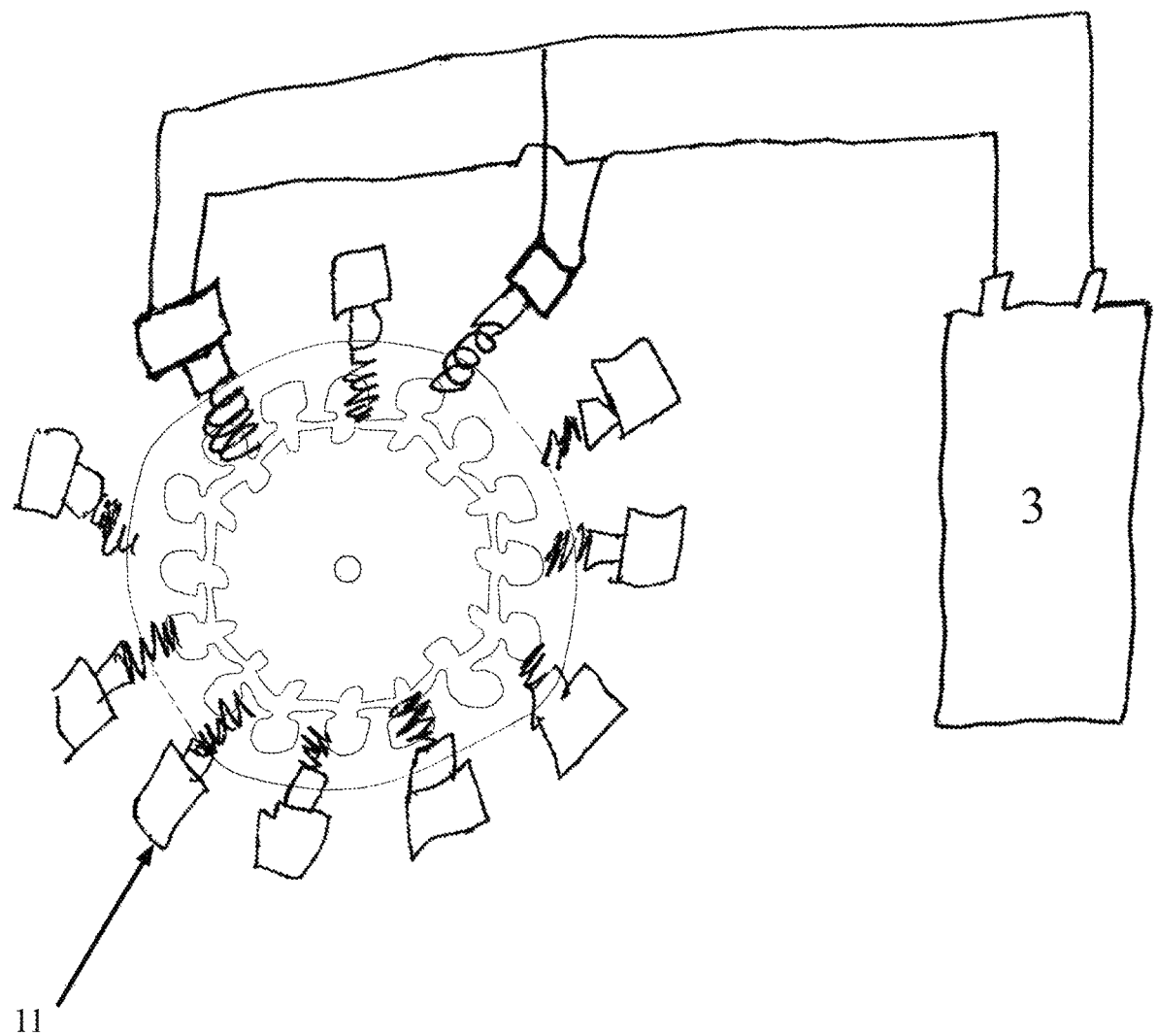
FIG. 10 is the same as FIG. 4 with a stator and rotor schematically represented as in FIG. 5 as assumed in FIG. 4 based on the title, disclosure and references.
Figure 11:
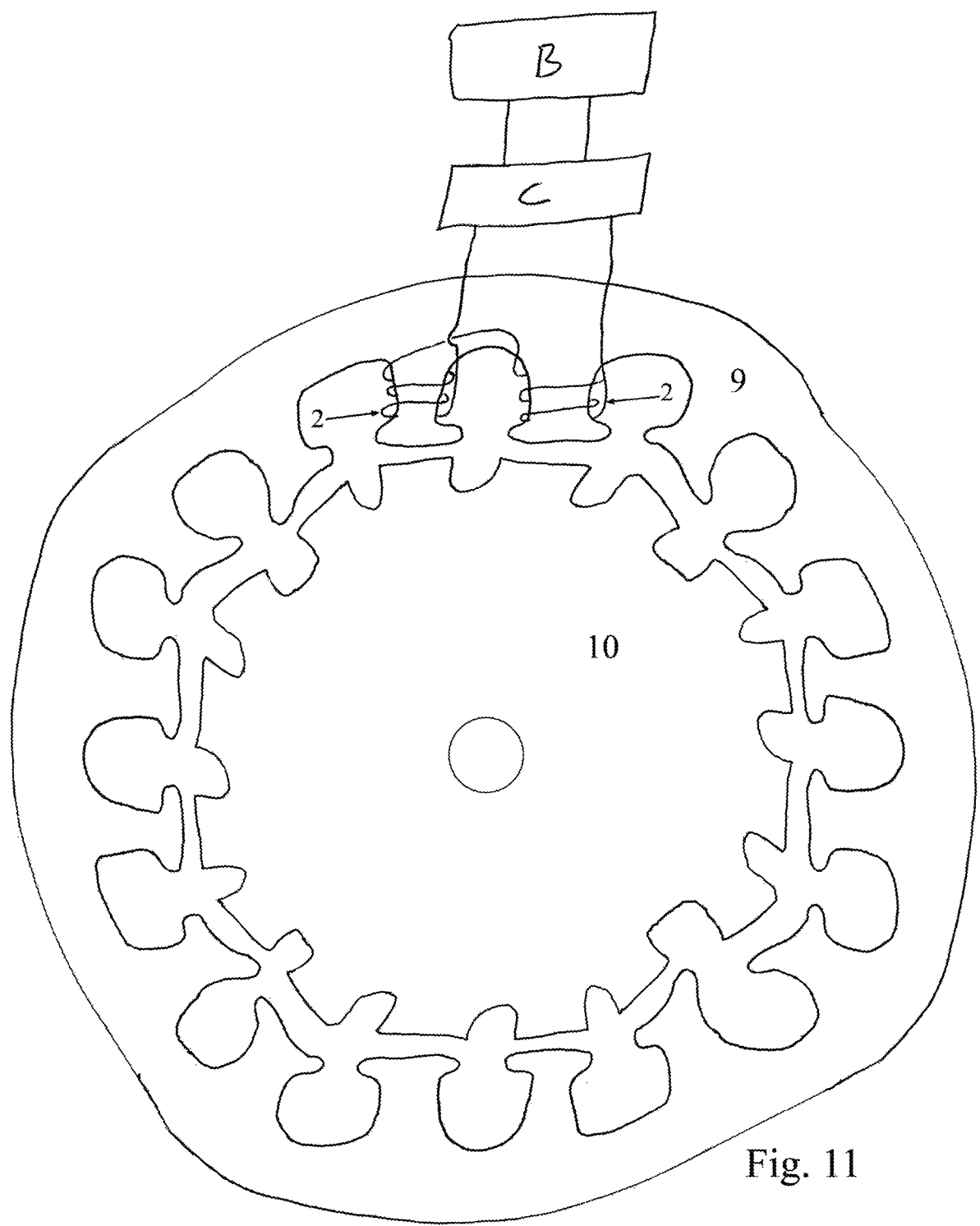
FIG. 11 is the same as FIG. 5 with more of a stator and rotor schematically represented as in FIG. 5 as assumed in FIG. 5 based on the title, disclosure and references.
Figure 12:
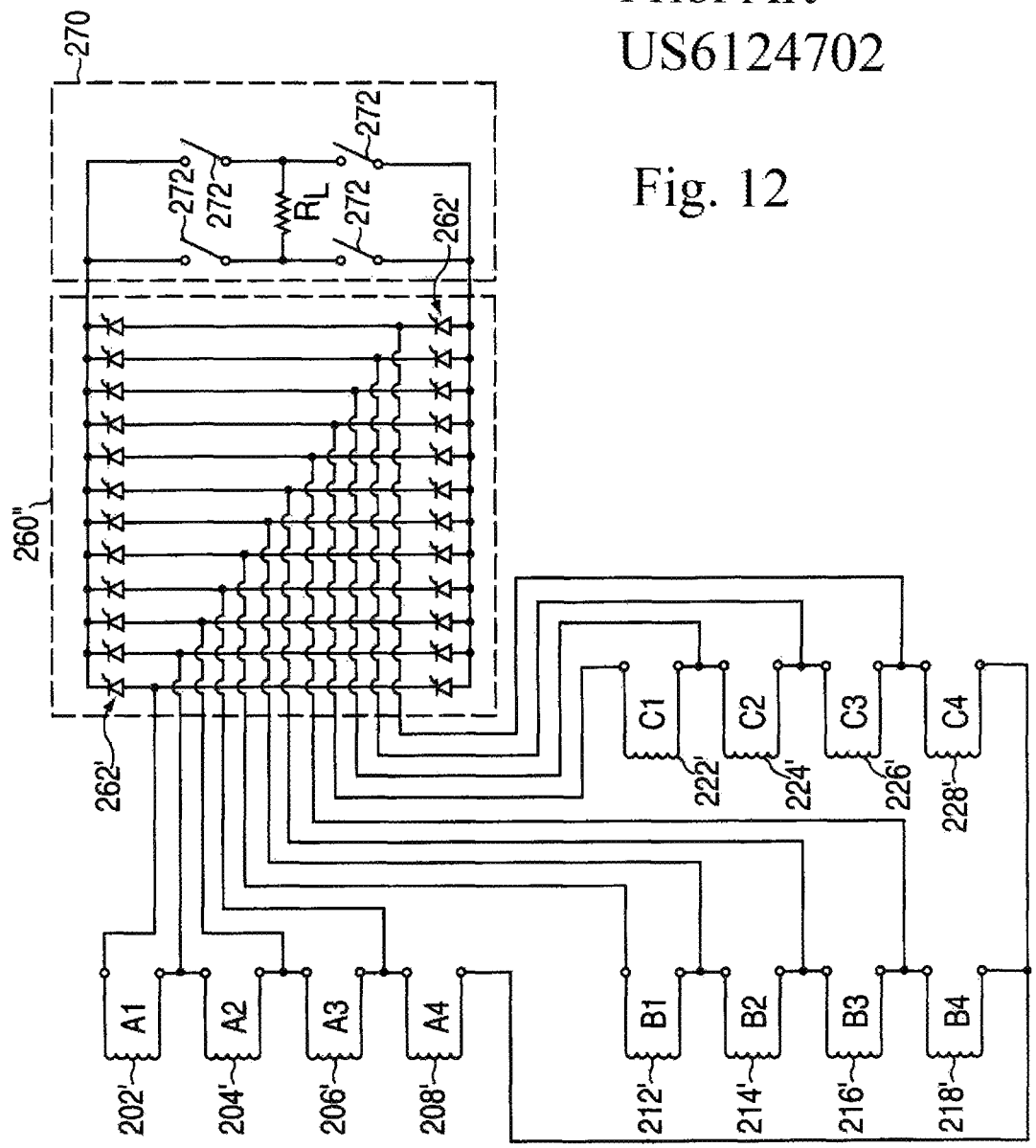
FIG. 12 is a prior art methods described as "cyclo converting" in U.S. Pat. No. 6,124,702 drawing FIG. 4C showing the switching of the coils between series and parallel schematically represented.

FIG. 5 block diagram illustrates another configuration where more than one individual pole windings wound in the same electric polarity are connected to a controller (C) which is connected to a single large individual chemical cell (B) which is a subset of the total stator frame windings partially shown 9 and partially shown rotor 10.

The batteries and controllers could be spaced around the motor in a manner similar to the evolution of the radial piston aircraft engines of increasing piston numbers with the engine shaft mounted fan or turbine providing air cooling. Or the wiring and controller and batteries could be exit the motor generator parallel to the shaft for a cooling arrangement of a long tube similar to the history of the radial or axial flow jet engine. The rotor could be held in a non magnetic vacuum chamber for reduced rotational losses in a augmented flywheel motor combination.

Nothing stated herein precludes or excludes other combinations and arrangements of the methods and mechanisms disclosed herein.

I claim:

1. A stator magnetic circuit comprising:
    at least two power groups, wherein each power group separately comprises a controller electrically connected directly to (a) a stator pole and coil and (b) a chemical cell; and
    a central controller electrically connected directly to the controller of each power group;
    wherein neither the stator pole and coil nor the chemical cell of one power group is electrically connected directly to either the stator pole and coil or the chemical cell of another power group;
    wherein the central controller individually directs the controller of each power group to alternate between (a) transferring electricity from the chemical cell to the stator pole and coil of each power group and (b) transferring electricity from the stator pole and coil to the chemical cell of each power group; and
    wherein the central controller simultaneously directs (a) a first power group to transfer electricity from the chemical cell of the first power group to the stator pole and coil of the first power group, and (b) a second power group to transfer electricity from the stator pole and coil of the second power group to the chemical cell of the second power group.

2. The stator magnetic circuit of claim 1, wherein electricity is transferred from the chemical cell to the stator pole and coil of the power groups at a low voltage and a high current.

3. The stator magnetic circuit of claim 1, wherein the stator pole and coil and the chemical cell of each power group is matched by voltage and amperage.

4. The stator magnetic circuit of claim 1, wherein the chemical cell of each power group operates between 1 to 3 volts.

5. The stator magnetic circuit of claim 4, wherein discharging or charging the chemical cells of all power groups adds up to more than 100 A.

6. The stator magnetic circuit of claim 1, wherein the stator pole and coil of each power group is directly electrically connected only to the controller of the power group, and the chemical cell of each power group is directly electrically connected only to the controller of the power group, during all operation of the circuit.

7. The stator magnetic circuit of claim 1, wherein the battery of each power group is only electrically connected directly to the controller of that power group during all operation of the circuit.

8. An electric motor generator comprising the stator magnetic circuit of claim 1 and further comprising a cooling system, wherein each power group is arranged around a frame of the electric motor generator such that the cooling system directs air flow over each power group.

9. A stator magnetic circuit comprising:
    at least two power groups electrically connected via a central controller;
    wherein each power group separately comprises (a) a stator pole and coil and (b) a chemical cell that are electrically connected by only a singular controller, wherein the stator pole and coil is only directly electrically connected to the controller, and wherein the chemical cell is only directly electrically connected to the controller;
    wherein the controller of each power group is electrically connected directly to the central controller;
    wherein each power group is not electrically connected directly to another power group; and
    wherein the central controller directs the controller of each power group individually to start (a) discharging electricity from the chemical cell to the stator pole and coil, and (b) charging electricity from the stator pole and coil to the chemical cell.

* * * * *